United States Patent [19]

Vogt et al.

[11] 4,012,189

[45] Mar. 15, 1977

[54] HOT GAS GENERATOR

[75] Inventors: Alfred Vogt, Schaan, Liechtenstein; Hans Mueller, Wartau-Weite, Switzerland

[73] Assignee: Interliz Anstalt, Vaduz, Liechtenstein

[22] Filed: Nov. 13, 1975

[21] Appl. No.: 631,545

[30] Foreign Application Priority Data

Dec. 7, 1974 Germany .......................... 2457963

[52] U.S. Cl. .............................. 431/353; 431/68; 431/167; 431/242; 431/158; 431/352
[51] Int. Cl.[2] ........................................ F23D 15/02
[58] Field of Search .......... 431/242, 243, 158, 352, 431/353, 167, 68

[56] References Cited

UNITED STATES PATENTS

| | | | |
|---|---|---|---|
| 3,298,418 | 1/1967 | Briggs | 431/352 X |
| 3,720,497 | 3/1973 | Arenson | 431/158 X |
| 3,756,764 | 9/1973 | Reichmann | 431/243 X |

*Primary Examiner*—Edward G. Favors
*Attorney, Agent, or Firm*—Frank J. Jordan

[57] ABSTRACT

A hot gas generator for the production of hot combustion gases includes a cylindrical combustion chamber having an inner and an outer air conduit concentrically disposed thereabout. A fuel nozzle means is arranged at one longitudinal end of the cylindrical combustion chamber and an exhaust port is arranged at the other longitudinal end thereof. A baffle plate is disposed on the longitudinal end of the cylindrical combustion chamber on which the fuel nozzle means is arranged. Combustion air from a blower or the like flows through the outer air conduit into the inner conduit where it is heated by the cylindrical combustion chamber and then passes through openings in the baffle plate into the cylindrical combustion chamber.

6 Claims, 9 Drawing Figures

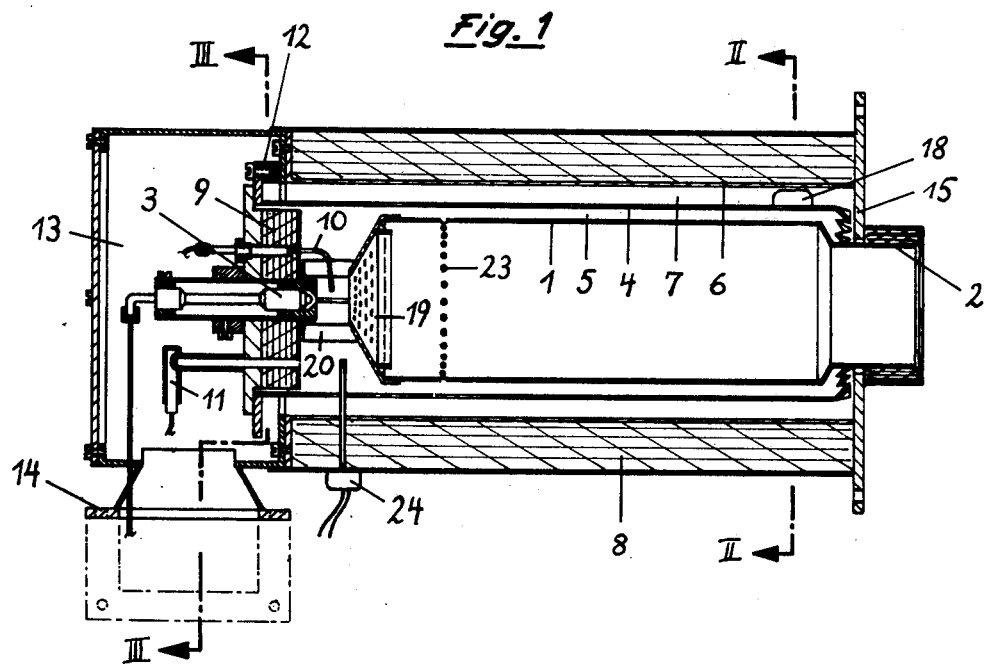

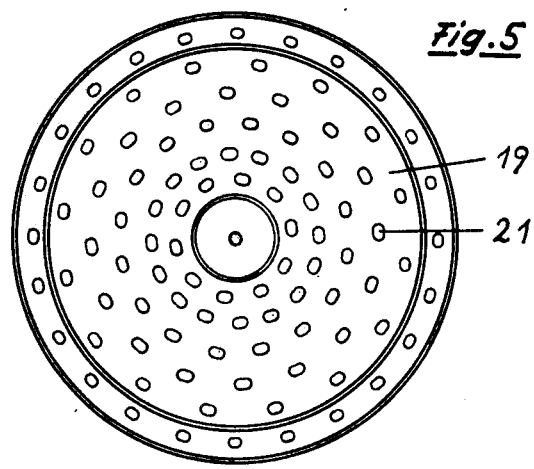
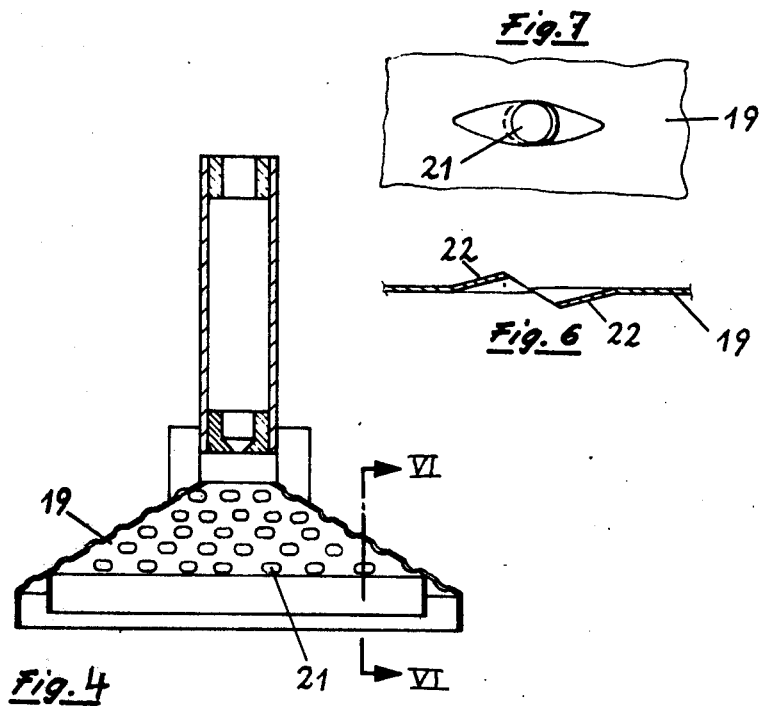

HOT GAS GENERATOR

BACKGROUND OF THE INVENTION

This invention relates to a hot gas generator for the production of hot combustion gases from liquid combustibles such as light fuel oil wherein the combustion gases, for example transfer their energy to heating water or similar material in a heat exchanger which is ancillary to the hot gas generator.

In conventional oil burners as they are used, for example for operating hot water boilers, soot arises or occurs particularly when the boiler is started up and also when the draft in the chimney varies. This soot causes fouling of the boiler or of other ancillary heating surfaces which results in greatly diminishing the heat transfer from the heating gases to the media which are to be heated, for example the boiler water. Furthermore, carbon monoxide and unburned hydrocarbons are produced which cause noxious odors from the oil burner due to the unburned hydrocarbons and also increased heating costs due to incomplete combustion.

Hot gas generators have been developed which atomize the fuel oil by means of a nozzle and, like in a conventional oil burner, mix it with an air stream which is produced by a blower, and burn the liquid fuel in a combustion chamber, the combustion chamber being a part of the hot gas generator. In these known generators a cylinder encloses the combustion chamber, such cylinder having at one end thereof an exhaust port for the hot gases and at the other end a port where the atomized liquid fuel and air are introduced. The cylinder is surrounded by two concentric ring-shaped cylindrical air conduits, and the blower is first led to the exhaust port end of the combustion chamber cylinder. From that end the blower air passes back to the fuel nozzle end of the inner air conduit along the hot combustion chamber cylinder, where then the preheated blower air enters into the combustion chamber cylinder and is admixed with the atomized liquid fuel. These known hot air generators have the disadvantage that it is never possible to keep the combustion chamber completely free of residues, so that after some time, soot precipitates and fouling of the combustion chamber occurs with all its disadvantages.

Accodingly, an object of the present invention is to provide a hot gas generator which is capable of producing soot-free combustion of fuel oil or similar fuels which is practically free of excess air, thus being stoechiometrical, needs very little space, and is not objectionable from the standpoint of pollution control. Such a generator will produce a hot gas of a very high temperature which will make it furthermore possible to heat, for example boiler aggregates for a central heating system, where said aggregates will not need any boiler combustion chamber, but will consist only of a very compact ancillary heating surface. Such heating surfaces may also be ribbed because no soot can precipitate upon them. Such ribs cannot be built into conventional oil burners because the soot would have to be removed periodically which is impossible because the heating surfaces are not easily accessible.

The present invention encompasses, in one embodiment, a hot gas generator having a cylindrical combustion chamber which has at one end an exhaust port and at the other end fuel nozzle means. The cylindrical combustion chamber is surrounded by two concentric cylindrical air conduits which are connected to each other at the exhaust end of the combustion chamber. Also the inner air conduit is connected to the inner space of the cylindrical combustion chamber at the fuel nozzle end of the combustion chamber, and the external air conduit is connected to a blower. A baffle plate is disposed at the fuel nozzle end of the cylindrical combustion chamber, such baffle plate filling completely the whole internal diameter of the cylindrical combustion chamber. The baffle plate is provided with openings for the air which streams or passes from the inner air conduit into the inner space of the cylindrical combustion chamber. The fuel nozzle means introduces fuel through an opening in the center of the baffle plate into the cylindrical combustion chamber.

As a particularly advantageous characteristic, openings in the baffle plate are arranged in a plurality of concentric circles and these openings are shaped and arranged in such a way that the air receives an angular momentum or rotary motion around the longitudinal axis of the cylindrical combustion chamber as it passes through such openings. The baffle plate which completely fills the entrance portion of the cylindrical combustion chamber renders possible a stabilization of the flame and results in an extraordinarily advantageous soot-free combustion of the liquid fuel. The realization of satisfactory soot-free combustion is also remarkably increased by a further characteristic of the present invention wherein the cylindrical combustion chamber is provided over its whole circumference at a distance from the baffle plate with one or more rows of holes for the introduction of air from the inner air conduit into the internal space of the cylindrical combustion chamber. A part of the blower air which is preheated by the cylindrical combustion chamber while passing through the inner air conduit is introduced through these holes as hot secondary air and is admixed at the outer rim zones of the fuel oil fog cone so that complete and satisfactory combustion of the fuel oil droplets at the rim zone is obtained and unburned hydrocarbons are precluded in the exhaust gases which leave the hot gas generator. Furthermore, the realization of completely pollution-free combustion is obtained by providing, according to another characteristic of the present invention, swirl vanes for the production of a helicoidal air stream within the inner air conduit. This arrangement materially improves the preheating of the blower air by the cylindrical combustion chamber, so that very hot primary air enters through the baffle plate into the cylindrical combustion chamber and also very hot secondary air is mixed into the outer rim zones of the fuel oil fog cone. Also during start-up of the hot gas generator complete and absolutely soot-free combustion of the liquid fuel occurs because the cylindrical combustion chamber is heated very quickly by the flame and thereby also provides very quickly a high preheating of the blower air.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

SUMMARY OF THE INVENTION

A hot gas generator for the production of hot combustion gases from liquid fuel includes a cylindrical combustion chamber, an inner air-feed cylinder concentrically disposed about the cylindrical combustion chamber, an inner air conduit between the cylindrical combustion chamber and the inner air-feed cylinder, an outer air-feed cylinder concentrically disposed about the inner air-feed cylinder, an outer air conduit between the inner and outer air-feed cylinders, fuel nozzle means arranged at one longitudinal end of the cylindrical combustion chamber, and an exhaust port arranged at the opposite longitudinal end of the cylindrical combustion chamber. The inner and outer air conduits communicate with one another at the exhaust end of the cylindrical combustion chamber while the inner air conduit and the inside of the cylindrical combustion chamber communicate with one another at the end of the cylindrical combustion chamber on which the fuel nozzle means is arranged. A baffle plate is disposed on the end of the cylindrical combustion chamber on which the fuel nozzle means is arranged, and the baffle plate has a central opening for the introduction of fuel from the fuel nozzle means. The outer air conduit receives forced draft air from a blower or the like and this air then passes into the inner air conduit and then through a plurality of openings in the baffle plate into the inside of the cylindrical combustion chamber.

BRIEF DESCRIPTION OF THE DRAWINGS

FIG. 1 is a longitudinal sectional view of a hot gas generator according to one embodiment of the present invention.

FIG. 2 is a sectional view taken along the line II—II in FIG. 1.

FIG. 3 is a sectional view taken along the line III—III in FIG. 1.

FIG. 4 is a longitudinal sectional view, on a larger scale, of the baffle plate used in the hot gas generator shown in FIG. 1.

FIG. 5 is a bottom view of the baffle plate shown in FIG. 4.

FIG. 6 is a sectional view of the baffle plate taken along the line VI—VI in FIG. 4.

FIG. 7 is a top view of the baffle plate shown in FIG. 6.

DESCRIPTION OF THE PREFERRED EMBODIMENTS

Figure 8:
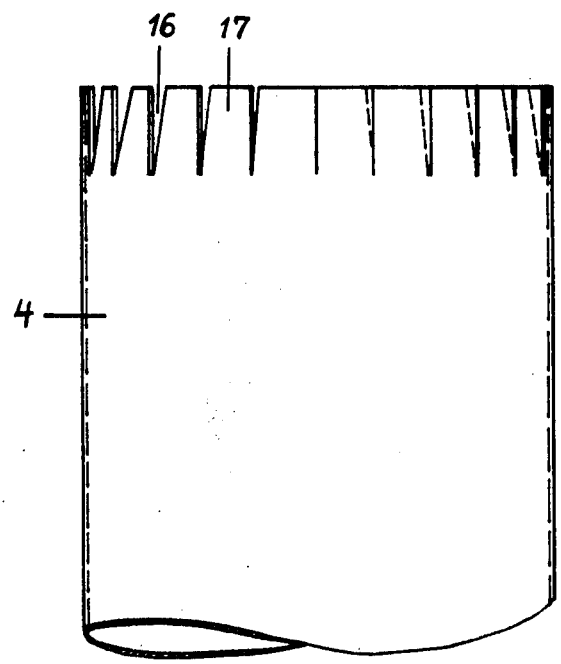
FIG. 8 is a partial side view of one longitudinal end portion of the inner air-feed cylinder used in the hot gas generator of FIG. 1.

Referring to the drawings, there is shown a hot gas generator having a cylindrical member which forms a cylindrical combustion chamber 1. The cylindrical combustion chamber 1 is made of high, heat-resistant steel and has a relatively thin wall thickness so that it may be heated very quickly by the combustion taking place in the cylindrical combustion chamber. The cylindrical combustion chamber 1 may be brought to a red hot temperature. At the right hand end of the cylindrical combustion chamber 1, as viewed in FIG. 1, there is disposed an exhaust port 2. A fuel nozzle means 3 opens into the left hand end of the cylindrical combustion chamber 1 and serves to atomize a liquid fuel, for example, a light fuel oil.

The cylindrical combustion chamber 1 is concentrically surrounded by an inner air-feed cylinder 4 which defines the outer boundary of an inner annular air conduit 5. The inner air-feed cylinder 4 is furthermore surrounded by an outer air-feed cylinder 6, which defines the outer boundary of an outer air conduit 7. The outer air-feed cylinder 6 is jacketed with insulation 8.

At the end of the cylindrical combustion chamber 1 near the exhaust, the two air conduits 5 and 7 are connected to each other to provide communication therebetween. At the end of the cylindrical combustion chamber cylinder 1 near the fuel nozzle means 3, the inner air-feed cylinder 4 is closed by a front plate 9. Between the front plate 9 and the cylindrical combustion chamber 1 there is provided a space or gap such that the inner air conduit 5 and the inner space of the cylindrical combustion chamber 1 are connected to provide communication therebetween. The front plate 9 is provided with the fuel nozzle means 3 and also with an ignition device 10 and a flame monitor 11. The front plate 9 is fastened to the outer air-feed cylinder 6 by fastening elements at a distance fixed by washers or spacer elements 12 so that the outer air conduit 7 is connected to and in communication with a chamber 13, the latter being furnished with a ventilator, for example, a conventional burner blower (not shown).

The combustion air is initially forced by a non-illustrated blower into the chamber 13 from where the air then passes towards the right (as viewed in FIG. 1) through the outer air conduit 7. The combustion air then again passes back towards the left (as viewed in FIG. 1) in the inner air conduit 5 so that it finally enters from the inner air conduit 5 into the combustion chamber 1 at the end of the latter near the fuel nozzle means 3. It will be observed that the air is preheated by the cylindrical combustion chamber as it passes through the inner air conduit 5.

Figure 9:
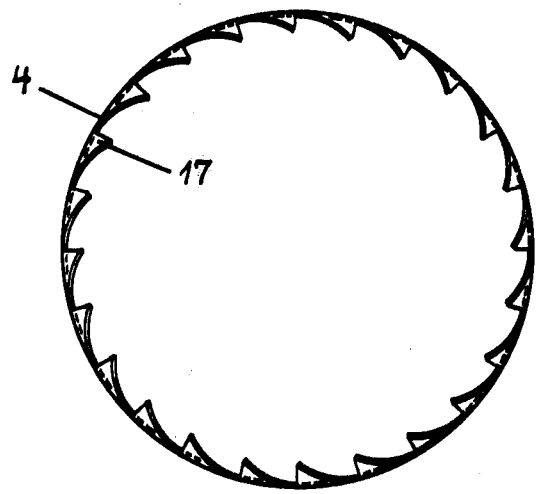
FIG. 9 is an end view of the inner air-feed cylinder shown in FIG. 8.

The inner air-feed cylinder 4 extends substantially up to a partition 15 which simultaneously closes both air conduits 5 and 7 at the exhaust end of the cylindrical combustion chamber 1. The end of the inner air-feed cylinder 4 which extends substantially up to the partition 15 or which may contact partition 15 is provided on its entire circumference with longitudinal slits 16 (FIGS. 8 and 9) between which tongues 17 are left standing. Each tongue 17 is twisted or bent around an axis generally parallel to the longitudinal axis of the cylindrical combustion chamber into the shape of a guiding vane as shown in FIG. 9. Thus guide vanes are formed at the beginning of the inner air conduit 5 and these vanes impart a screw-like or helical-like twist to the air which streams from the outer air conduit 7 into the inner air conduit 5. This helical-like air stream increases the heat exchange between the cylindrical combustion chamber 1 which is heated by the combustion which occurs therein and the air. Thus a preheating of the combustion air may be obtained reaching about 600° C (1112° F).

The left hand end of the inner air-feed cylinder 4 as shown in FIG. 3 is supported by the front plate 9, and the right hand end of the inner air-feed cylinder 4 is supported on the outer air-feed cylinder 6 by spaced center supports 18.

A frustrum-shaped baffle plate 19 is disposed upon the fuel nozzle end of the cylindrical combustion chamber 1, such baffle plate 19 extending over the whole diameter of the cylindrical combustion chamber 1 and also filling the entire cross-section of the cylindrical combustion chamber 1 at the end through which the combustion air enters into the cylindrical combustion chamber 1. The outer circumferential rim of the baffle plate 19 is connected to the cylindrical combustion chamber 1. A tube-shaped headpiece 20 is connected to the inner circumferential rim of the baffle plate 19 and extends to the front plate 9. Liquid fuel is sprayed by the fuel nozzle means 3 into the combustion chamber 1 through the headpiece 20 and through the opening in the center of the baffle plate 19.

The baffle plate 19 is furnished with openings 21 for the primary air. These openings 21 are arranged in several concentrically disposed rings of holes as shown in FIG. 5. The individual holes 21 of these rings of holes thus traverse the baffle plate 19 and may be formed or shaped by stampings 22 (FIG. 6) in the baffle plate in such a way that the air, when streaming through the holes 21 has imparted thereto a rotatory momentum around the longitudinal axis of the cylindrical combustion chamber 1. The plurality of individual holes 21 results in a plurality of rotary partial streams and thereby provides for a uniform and intensive mixing of the primary air with the fuel oil fog cone which is produced by the fuel nozzle means 3.

At a distance from the baffle plate 19 the cylindrical combustion chamber 1 is provided with a row of holes 23 which extend over the entire circumference of the cylinder 1. Instead of one row of holes, alternatively several rows of holes may also be used. Through the row of holes 23 a certain amount of combustion air, preheated in the inner air conduit 5, passes as secondary air into the combustion chamber 1 where it is mixed into the outer rim zones of the oil fog cone, thereby resulting in a clean and complete combustion of the rim zone oil droplets. The liquid fuel is completely burned within the cylindrical combustion chamber where a stoechiometric amount of air suffices and soot-free combustion occurs. A clean and non-polluting hot gas issues from the cylindrical combustion chamber 1 at a temperature of about 1200° C to 1700° C (2200° F to 3100° F) which is advantageous for the ensuing heat exchange processes.

The exhaust port 2 of the cylindrical combustion chamber has a diameter which is smaller than the inner diameter of the cylindrical combustion chamber 1. This narrowing of the exhaust end of the combustion chamber 1 also contributes to a clean and non-polluting combustion in cooperation with the baffle plate 19, the guide vanes 17, and the row of holes 23 for secondary air.

A thermostat 24 is disposed in the space between the baffle plate 19 and the front plate 9, an arrangement which prevents the hot gas generator from starting up again after having been shut off and before the combustion chamber has cooled down, thus preventing explosions when the combustion chamber is still hot.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. A hot gas generator for the production of hot combustion gases from liquid fuel comprising a cylindrical combustion chamber, an inner air-feed cylinder concentrically disposed about said cylindrical combustion chamber, an inner air conduit between said cylindrical combustion chamber and said inner air-feed cylinder, an outer air-feed cylinder concentrically disposed about said inner air-feed cylinder, an outer air conduit between said inner and outer air-feed cylinders, fuel nozzle means arranged at one longitudinal end of said cylindrical combustion chamber, an exhaust port arranged at the opposite longitudinal end of said cylindrical combustion chamber, said inner and outer air conduits communicating with one another at the exhaust end of said cylindrical combustion chamber, guide means disposed on one longitudinal end of said inner air-feed cylinder for imparting a rotary motion to the air passing into said inner air-feed cylinder from said outer air-feed cylinder, said inner air conduit and the inside of said cylindrical combustion chamber communicating with one another at the end of the cylindrical combustion chamber on which the fuel nozzle means is arranged, said outer air conduit receiving combustion air from a blower or the like, a baffle plate disposed on the longitudinal end of said cylindrical combustion chamber on which the fuel nozzle means is arranged, said baffle plate having a central opening for the introduction of fuel from said fuel nozzle means, said baffle plate having a plurality of opening means for combustion air to pass from said inner air conduit to the inside of said cylindrical combustion chamber, said opening means imparting a rotary motion to the air passing into said cylindrical combustion chamber, said latter rotary motion being imparted to the air relative to the longitudinal axis of said cylindrical combustion chamber.

2. A hot gas generator according to claim 1 comprising a partition at the exhaust end of said cylindrical combustion chamber, said outer air-feed cylinder extending to said partition, said inner air-feed cylinder having said one longitudinal end extending substantially up to said partition, said guide means comprising longitudinal slits defining tongue means therebetween, said tongue means having an arcuate configuration relative to an axis parallel to the longitudinal axis of said cylindrical combustion chamber, said arcuate tongue means forming guiding vanes to impart a helical motion to the air passing through said inner air conduit.

3. A hot gas generator according to claim 1 wherein said baffle plate has a frusto-conical configuration, said baffle plate having an outer rim joined to the longitudinal end of said cylindrical combustion chamber on which the fuel nozzle means is located, a pipe means connected to said central opening in said baffle plate, said fuel nozzle means introducing fuel into said cylindrical combustion chamber through said pipe means, a front plate closing off the longitudinal end of said inner air conduit at which said fuel nozzle means is located, said pipe means extending to said front plate, said front plate mounting said fuel nozzle means and one longitudinal end of said inner air-feed cylinder.

4. A hot gas generator according to claim 3 including spacer means for connecting said outer air-feed cylinder to said front plate, thereby providing a space for combustion air to pass from a blower or the like into said outer air conduit.

5. A hot gas generator according to claim 3 including spaced centering support means between said inner air-feed cylinder and said outer air-feed cylinder, said spaced centering support means being located on the longitudinal end portion of said inner and outer air-feed cylinders opposite said front plate.

6. A hot gas generator according to claim 3 further comprising a temperature monitoring means provided externally of said cylindrical combustion chamber between said baffle plate and said front plate and which is operable to prevent start-up of the hot gas generator when the cylindrical combustion chamber is still hot.

* * * * *